United States Patent
Chu et al.

(10) Patent No.: US 10,826,625 B1
(45) Date of Patent: Nov. 3, 2020

(54) ANTENNA CALIBRATION NETWORK SYSTEM, ANTENNA CALIBRATION NETWORK AND MIMO ANTENNA

(71) Applicant: AAC Technologies Pte. Ltd., Singapore (SG)

(72) Inventors: Qingchen Chu, Shenzhen (CN); Li Han, Shenzhen (CN); Yuehua Yue, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/993,306

(22) Filed: Aug. 14, 2020

Related U.S. Application Data

(63) Continuation of application No. PCT/CN2019/094103, filed on Jun. 30, 2019.

(51) Int. Cl.
| | |
|---|---|
| H04L 5/12 | (2006.01) |
| H04B 17/11 | (2015.01) |
| H04B 17/21 | (2015.01) |
| H04B 7/0417 | (2017.01) |
| H01Q 21/24 | (2006.01) |

(52) U.S. Cl.
CPC .......... H04B 17/11 (2015.01); H01Q 21/24 (2013.01); H04B 7/0417 (2013.01); H04B 17/21 (2015.01)

(58) Field of Classification Search
CPC ...... H04B 17/11; H04B 17/21; H04B 7/0417; H01Q 21/24
USPC ................ 375/262, 261, 259, 219, 295, 316
See application file for complete search history.

(56) References Cited

U.S. PATENT DOCUMENTS

| | | | |
|---|---|---|---|
| 2004/0032365 A1* | 2/2004 | Gottl | H01Q 1/246 342/368 |
| 2019/0115667 A1* | 4/2019 | Liang | H01Q 21/26 |

* cited by examiner

*Primary Examiner* — Zewdu A Kassa
(74) *Attorney, Agent, or Firm* — W&G Law Group LLP

(57) ABSTRACT

An antenna calibration network system, an antenna calibration network and a MIMO antenna are provided, and the antenna calibration network system includes a substrate, directional coupler groups provided on the substrate and arranged in a horizontal direction, and a multi-stage combiner network provided at front ends of the directional coupler groups. A parallel coupled line of each directional coupler extends along a horizontal direction. The multi-stage combiner network includes first-stage combiners arranged at one side of the directional coupler groups, and second-stage combiners cascaded with the first-stage combiner and passing between the two directional coupler groups corresponding to the two first-stage combiners to the other side of the plurality of the directional coupler groups. A space utilization rate of the calibration network board can be improved, a size of the calibration network board can be reduced, and antenna cost can be reduced.

8 Claims, 4 Drawing Sheets

ANTENNA CALIBRATION NETWORK SYSTEM, ANTENNA CALIBRATION NETWORK AND MIMO ANTENNA

TECHNICAL FIELD

The present invention relates to the field of communication technology and, in particular, to an antenna calibration network system, an antenna calibration network and a MIMO antenna.

BACKGROUND

With the application and gradual commercialization of large-scale array antennas in next-generation mobile communication technology, since 5G antennas have more ports and denser station layouts compared with traditional 4G antennas, more stringent requirements are put on cost of antennas. Multiple-Input Multiple-Output (MIMO) technology, as an important means to increase a data transmission rate, has drawn great attention, and the MIMO technology is considered to be one of key alternative technologies for the next-generation communication (5G) technology.

A MIMO array antenna is mainly composed of an antenna vibrator, a feeding network board, a calibration network board, among which the calibration network board accounts for nearly half of cost of the MIMO array antenna due to use of four layers of laminated multi-layer boards, so the cost can be effectively reduced by reducing the calibration network boards.

As shown in FIG. 1, the calibration network is generally composed of circuits formed by cascading of directional couplers 101 and multi-stage combiners 102, the circuits of the directional couplers 101 and the multi-stage combiners 102 on the calibration network board are arranged vertically, and the circuits are relatively scattered in space, so the calibration network board has a low utilization rate and relatively high cost.

SUMMARY

An antenna calibration network system, an antenna calibration network and a MIMO antenna are provided, which can improve the space utilization rate of the calibration network board, reduce the size of the calibration network board, and reduce the antenna cost.

An antenna calibration network system for monitoring and comparing amplitudes and phases of a plurality of radio frequency signal ports includes: a substrate; a plurality of directional coupler groups provided on the substrate and arranged in a horizontal direction; a multi-stage combiner network provided at front ends of the plurality of directional coupler groups. Each of the plurality of directional coupler groups includes two directional couplers arranged to be mirrored with respect to a vertical direction, each of the two directional couplers includes an input terminal connected to one of the plurality of radio frequency signal ports and a coupling terminal connected to the multi-stage combiner network and is a parallel coupled wire directional coupler, and a parallel coupled wire of each of the two directional couplers extends along the horizontal direction. The multi-stage combiner network includes a plurality of first-stage combiners and a plurality of second-stage combiners. Each of the plurality of first-stage combiners includes two input terminals respectively connected to the coupling terminals of the two directional couplers of one of the plurality of directional coupler groups, and the plurality of first-stage combiners is arranged at one side of the plurality of directional coupler groups, and the plurality of second-stage combiners and the plurality of first-stage combiners are cascaded. Each of the plurality of second-stage combiners has two input terminals respectively connected to output terminals of two adjacent first-stage combiners of the plurality of first-stage combiners, and passes between two adjacent directional coupler groups of the plurality of directional coupler groups corresponding to the two adjacent first-stage combiners to the other side of the plurality of directional coupler groups.

As an improvement, the two adjacent first-stage combiners are symmetrically arranged at two sides of one of plurality of second-stage combiners connected thereto, respectively.

As an improvement, the two adjacent first-stage combiners are symmetrically arranged at two sides of one of plurality of second-stage combiners connected thereto, respectively.

As an improvement, the multi-stage combiner network further includes a plurality of second-above-stage combiners that is cascaded and arranged at a same side of the plurality of directional coupler groups as the plurality of second-stage combiners, and every adjacent combiners with a same stage of the multi-stage combiner network are symmetrically arranged at two sides of a combiner of the multi-stage combiner network having a higher stage than the stage of the adjacent combiners and connected to the adjacent combiners.

An antenna calibration network is provided, the antenna calibration network includes: at least two antenna calibration network systems including a first antenna calibration network system and a second antenna calibration network system; a calibration port; and a final-stage combiner. The at least two antenna calibration network systems includes a first antenna calibration network system and a second antenna calibration network system, and each of the at least two antenna calibration network systems is the antenna calibration network system as described above, the multi-stage combiner network of the first antenna calibration network system is a first multi-stage combiner network, and the multi-stage combiner network of the second antenna calibration network system is a second multi-stage combiner network. The first multi-stage combiner network and the second multi-stage combiner network are mirrored with respect to a horizontal line where the calibration port is located. The final-stage combiner is provided between the first multi-stage combiner network and the second multi-stage combiner network, and the final-stage combiner has two input terminals respectively connected to an output terminal of a highest-stage combiner of the first multi-stage combiner network and an output terminal of a highest-stage combiner of the second multi-stage combiner network, and an output terminal connected to the calibration port.

As an improvement, the final-stage combiner includes a first input terminal, a second input terminal and an output terminal. A connecting wire between the first input terminal of the final-stage combiner and the output terminal of the highest-stage combiner of the first multi-stage combiner network extends along the vertical direction, a connecting wire between the second input terminal of the final-stage combiner and the output terminal of the highest-stage combiner of the second multi-stage combiner network extends along the vertical direction, and a connecting wire between the output terminal of the final-stage combiner and the calibration port extends along the horizontal direction.

A MIMO antenna include a feeding network board, a reflective board, a dielectric board, a calibration network board, and a feeding core that are sequentially stacked. The feeding network board includes a feeding substrate and a plurality of sets of power division circuits provided on a surface of the feeding substrate facing away from the reflective board. The calibration network board includes a calibration substrate and the antenna calibration network as described above, the antenna calibration network is provided on a surface of the calibration substrate facing the dielectric board, and the coupling terminal of each of the two directional couplers is connected to an input terminal of one set of the plurality of sets of power division circuits arranged on the feeding network board through the feeding core.

As an improvement, the input terminal of each of the plurality of directional coupler groups arranged on the calibration network board is connected to a radio frequency connector.

As an improvement, each of the two directional couplers of each of the plurality of directional coupler groups arranged on the calibration network board is close to the radio frequency connector, and the input terminal of each set of the plurality of sets of power division circuits arranged on the feeding network board is close to the radio frequency connector.

In the antenna calibration network system, the antenna calibration network and the MIMO antenna described above, the plurality of the directional coupler groups of the antenna calibration network are arranged along the horizontal direction, the first-stage combiner of the multi-stage combiner network is arranged at one side of the plurality of the directional coupler groups, the second-stage combiner of the multi-stage combiner network is provided between each of the directional coupler groups and arranged at the other side of each of the directional coupler groups relative to the first-stage combiner. In this way, space occupied by the directional coupler is reduced, free space among each directional coupler group is fully utilized, and the space utilization rate of the circuit is improved. Therefore, with the antenna calibration network provided by the above embodiment, the antenna cost is effectively reduced and the product competitiveness is improved.

DESCRIPTION OF EMBODIMENTS

The present invention will be further described below with reference to the accompany drawings and embodiments.

Figure 1:
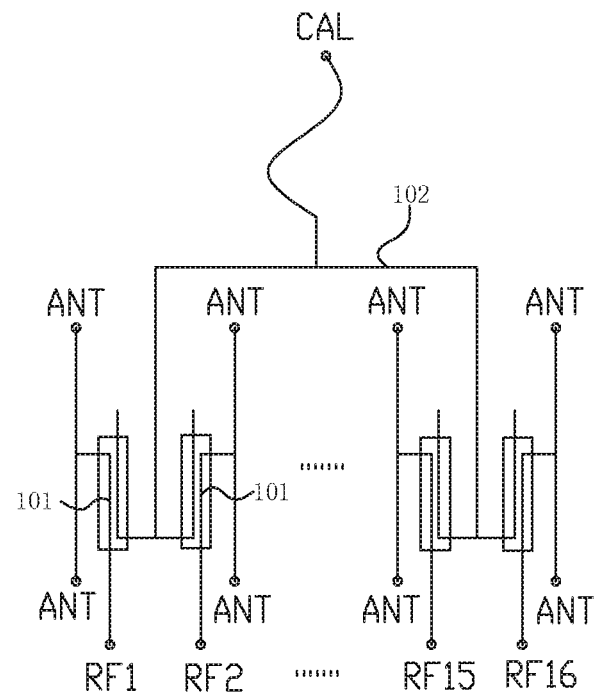
FIG. 1 is a schematic diagram of an antenna calibration network in related art.
Figure 2:
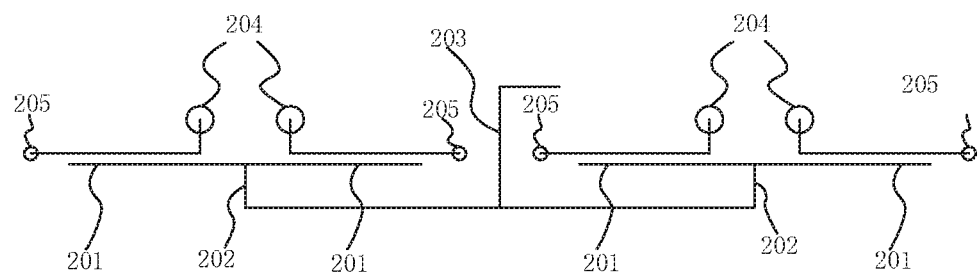
FIG. 2 is a logic schematic diagram of an antenna calibration network system.

FIG. 2 is a schematic diagram of an antenna calibration network system, and the antenna calibration network system is configured to monitor and compare amplitudes and phases of a plurality of radio frequency signal ports, which can improve a space utilization rate of a calibration network board, reduce a size of the calibration network board, and reduce cost of the antenna. As shown in FIG. 2, the antenna calibration network system includes a substrate, multiple directional coupler groups provided on the substrate, and a multi-stage combiner network provided at front ends of the directional coupler groups. The directional coupler 201 refers to a microwave/millimeter wave component configured to isolate, separate and mix signals, and a plurality of the directional couplers 201 can be cascaded into one directional coupler group. For example, two adjacent directional couplers 201 on the substrate are cascaded into one directional coupler group, and the antenna calibration network includes a plurality of directional coupler groups. The combiner refers to a device that combines energy of a plurality of paths of input signals into one path of output energy. The multi-stage combiner network is formed by cascading of the multi-stage combiners, for example, a first-stage combiner is cascaded with a second-stage combiner, the second-stage combiner is cascaded with a third-stage combiner, and so on, to form a multi-stage combiner network.

In an embodiment, each directional coupler group includes two directional couplers 201 that are mirrored with respect to a vertical direction, and each directional coupler 201 includes an input terminal connected to a radio frequency signal port 204 and a coupling terminal connected to the multi-stage combiner network. Each directional coupler 201 is a parallel coupled wire directional coupler, a parallel coupled wire of the directional couplers 201 extends along a horizontal direction, and the multiple directional coupler groups are arranged in the horizontal direction.

The multi-stage combiner network includes first-stage combiners 202 and second-stage combiners 203. Two input terminals of each first-stage combiner 202 are connected to the coupling terminals of the two directional couplers 201 of each directional coupler group, and the first-stage combiners 202 are arranged at one side of the plurality of directional coupler groups. The second-stage combiner 203 and the first-stage combiner 202 are cascaded. Each second-stage combiner 203 has two input terminals respectively connected to output terminals of two adjacent first-stage combiners 202, and passes between two directional coupler groups corresponding to the two adjacent first-stage combiners 202 to the other side of the plurality of directional coupler groups, and is located closely adjacent to the two directional coupler groups.

The directional couplers 201 are disposed on a same horizontal plane of the substrate, which reduces a thickness of the calibration network board. The multi-stage combiner network includes multiple stages of two-in-one combiner network. With continued reference to FIG. 2, the input terminal of the first-stage combiner 202 is the coupling terminal of the directional coupler group, the first-stage combiner 202 is disposed at a side of the directional coupler 201, the two adjacent first-stage combiners 202 are connected and then connected to the second-stage combiner 203, the second-stage combiner 203 includes two input terminals and an output terminal, the two input terminals of the second-stage combiner 203 are respectively connected to the output terminals of two adjacent two first-stage combiners 202, and connecting wires thereof are provided between two directional coupler groups and provided to be mirrored with respect to the vertical direction. The output terminal of the second-stage combiner 203 is connected to an input terminal of a higher-stage combiner, a connecting wire between the output terminal of the second-stage combiner 203 and the input terminal of the higher-stage combiner is provided at a side of the second-stage combiner 203 same as the higher-stage combiner. The higher-stage combiner refers to a combiner having a stage higher than the second stage of the second-stage combiner, that is, a third-stage combiner. In an embodiment, two adjacent first-stage combiners 202 are symmetrically arranged on two sides of the second-stage combiner 203 connected thereto, respectively.

The antenna calibration network provided in the present embodiment, the arrangement of the directional coupler and the combiner is changed from a conventional vertical layout to a horizontal layout, which reduces the occupied space of the calibration network. The multi-stage combiner arranged at the front end of the coupling terminal of the directional coupler are arranged between the directional couplers, which can fully utilizes the free space among the directional coupler groups and improve the occupancy rate of the circuit. Therefore, the antenna calibration network provided by the present embodiment can effectively reduce the antenna cost and improve product competitiveness.

In an embodiment, with continued reference to FIG. 2, the substrate is further provided with a radio frequency signal port 204. In an embodiment, each directional coupler group is formed by cascading of the two directional couplers 201 that are adjacent to each other on the substrate, and the two directional couplers 201 are symmetrically arranged at two sides of the radio frequency signal port 204 that is adjacent to the two directional coupler 201 located on the substrate. Similarly, the other directional coupler group is arranged in the horizontal array. The substrate is also provided with an input terminal 205 of a power division circuit on a feeding network board connected to, for example, an antenna device, the input terminal 205 of the power division circuit on the feeding network board is connected to the radio frequency signal port 204, and the input terminal 205 of the power division circuit on the feeding network board is close to the radio frequency signal port 204.

In an embodiment, the multi-stage combiner network further includes a plurality of second-above-stage combiners, the plurality of the second-above-stage combiners is cascaded and arranged on a same side of the plurality of the directional coupler groups as the second-stage combiners, and adjacent combiners with a same stage are symmetrically arranged on two sides of a higher-stage combiner connected to the adjacent combiners. The combiners with a same stage refer to combiners at the same stage, for example, two second-stage combiners have a same stage, a higher-stage combiner can be understood as a combiner having a stage higher than the combiners having the same stage, for example, the third-stage combiner is a higher-stage combiner with respect to two second-stage combiners, and a fourth-stage combiner is a higher-stage combiner with respect to the third-stage combiners.

Figure 3:
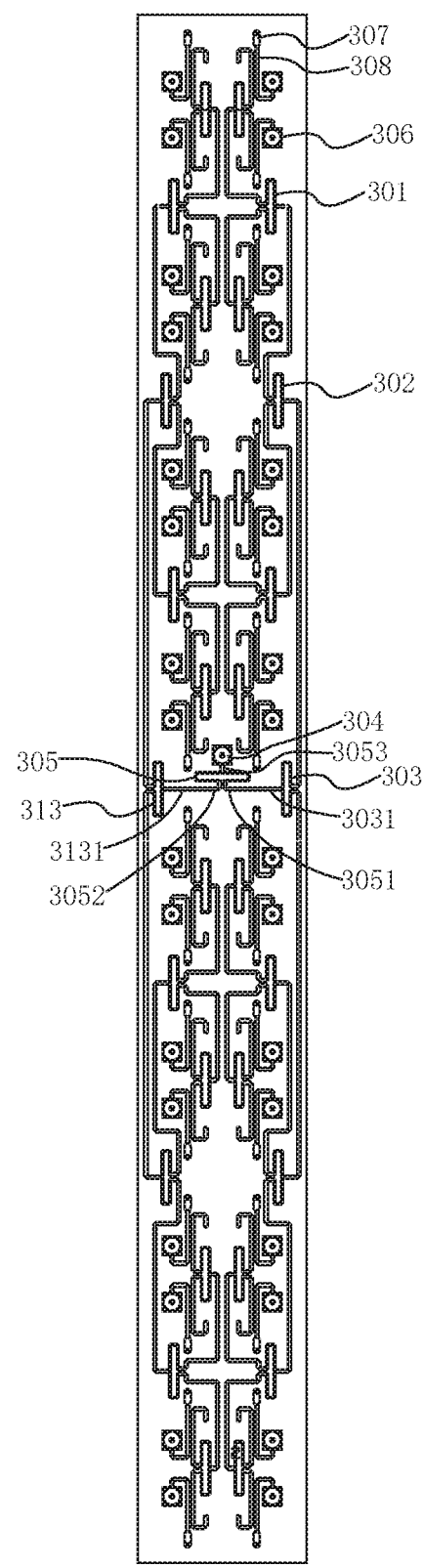
FIG. 3 is a schematic diagram of an antenna calibration network.

FIG. 3 is a schematic diagram of an antenna calibration network. The multi-stage combiner network includes a first-stage combiner 309, a second-stage combiner 301, a third-stage combiner 302 and a fourth-stage combiner 303, and the second-stage combiner 301, the third-stage combiner 302 and the fourth-stage combiner 303 are arranged in cascade at a same side of the plurality of the directional coupler groups.

It can be seen that in the antenna calibration network provided by the embodiment, the combiner at each stage makes full use of free space among the directional coupler groups for wire layout, which lead a compact structure and a high utilization rate.

Figure 4:
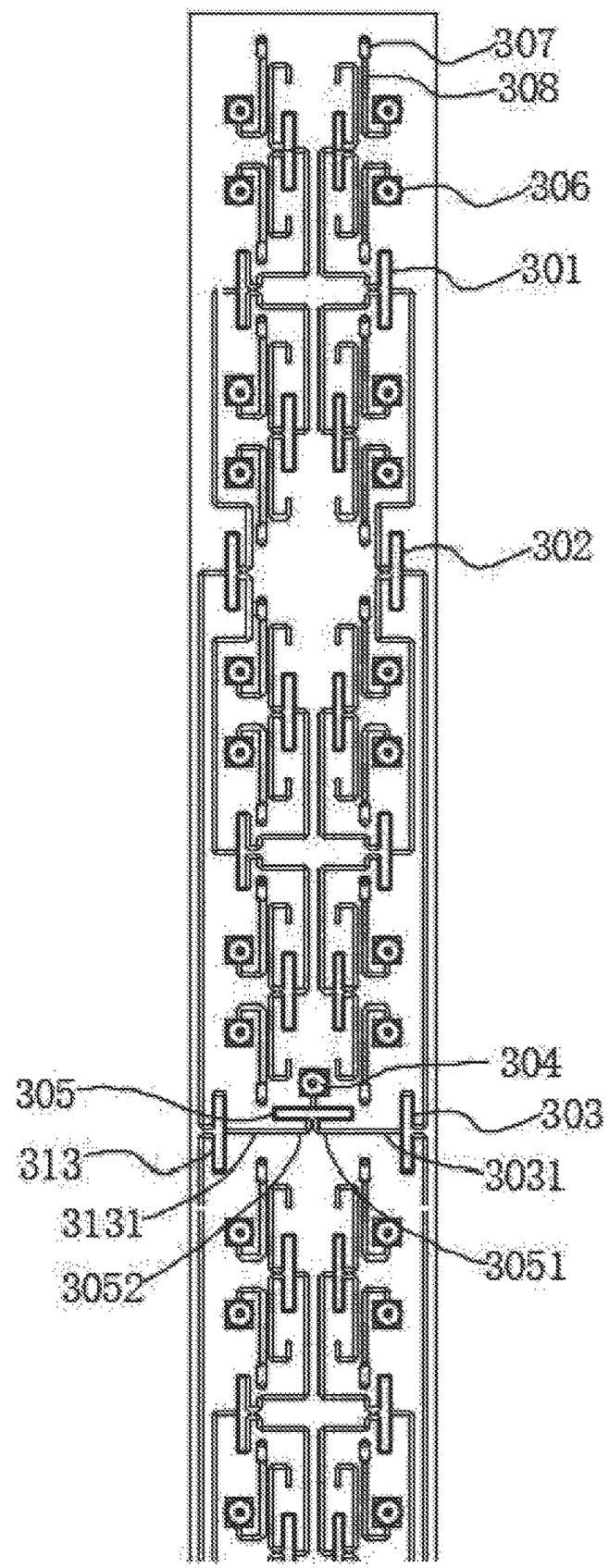
FIG. 4 is a partially enlarged schematic diagram of the antenna calibration network shown in FIG. 3.

With continued reference to FIG. 3, and in conjunction with FIG. 4, the antenna calibration network includes at least two antenna calibration network systems as described in the above embodiment and a calibration port 304. The at least two antenna calibration network systems includes a first antenna calibration network system and a second antenna calibration network system. The first antenna calibration network system includes the first multi-stage combiner network, and the second antenna calibration network system includes a second multi-stage combiner networks. The first multi-stage combiner network and the second multi-stage combiner network are mirrored with respect to a horizontal line where the calibration port 304 is located.

The antenna calibration network also includes a final-stage combiner 305 provided between the first multi-stage combiner network and the second multi-stage combiner network, two input terminals of the final-stage combiner 305 are respectively connected to an output terminal of a highest-stage combiner of the first multi-stage combiner network and an output terminal of a highest-stage combiner of the second multi-stage combiner network, and an output terminal of the final-stage combiner 305 is connected to the calibration port 304. The highest-stage combiner can be understood as the highest-stage combiner of the multi-stage combiner network, for example, the multi-stage combiner network includes four stages of combiners, and the fourth-stage combiner is the highest-stage combiner. The final-stage combiner can be understood as a last-stage combiner connected to the calibration port, and it is connected to the highest-stage combiner of the multi-stage combiner network.

In an embodiment, the highest-stage combiner of the first multi-stage combiner network is a fourth-stage combiner 303, and the highest-stage combiner of the second multi-stage combiner network is a fourth-stage combiner 313. The final-stage combiner 305 includes a first input terminal 3051, a second input terminal 3052, and an output terminal 3053. A connecting wire between the first input terminal 3051 and an output terminal 3031 of the fourth-stage combiner 303 extends along a vertical direction. A connecting wire between the second input terminal 3052 and an output terminal 3131 of the fourth-stage combiner 313 extends along the vertical direction. A connecting wire between the output terminal 3053 and the calibration port 304 extends along the horizontal direction.

The antenna calibration network provided by the present invention can reduce the space occupied by the directional coupler, make full use of the free space among each directional coupler group, and improve line space utilization. Therefore, the antenna calibration network provided by the present embodiment can effectively reduce the antenna cost and improve product competitiveness.

Figure 5:
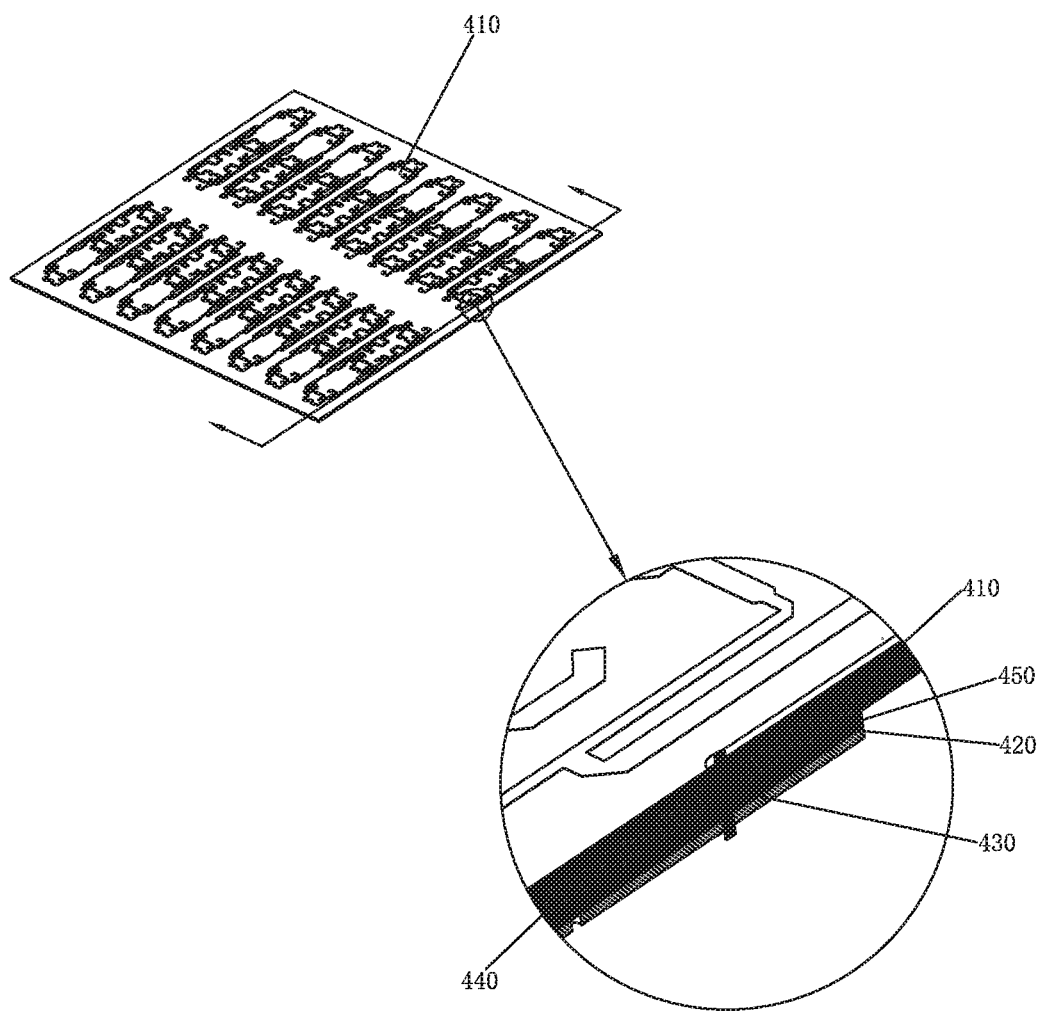
FIG. 5 is a partial schematic diagram of a MIMO antenna.

Based on the same inventive concept, a MIMO antenna is provided as follows, as shown in FIG. 5, it is a partial schematic diagram of a MIMO antenna, and the MIMO antenna includes a feeding network board 410, a reflective board 440, a dielectric board 450, a calibration network board 420, and a feeding core 430 that are sequentially stacked.

The feeding network board 410 includes a feeding substrate and a plurality of sets of power division circuits provided on a surface of the feeding substrate facing away from the reflective board 440. The calibration network board 420 includes a calibration substrate and the antenna calibration network as described in the above embodiment and provided on a surface of the calibration substrate facing the dielectric board 450, and the coupling terminal of each directional coupler of the antenna calibration network is connected to the input terminal of each set of the power division circuits on the feeding network board 410 through the feeding core 430.

Referring to FIG. 4 and FIG. 5, the input terminal of directional coupler 308 on the calibration network board 420 is connected to the radio frequency signal interface 306, the radio frequency signal interface 306 is connected to a radio frequency connector, and the radio frequency connector can be a SMP-series radio frequency coaxial connector, which can reduce a volume of the calibration network board. In an embodiment, each directional coupler 308 on the calibration network board 420 is close to the radio frequency connector, and a port 307 of the directional coupler 308 connected to the input terminal of a set of the power division circuits on the feeding network board 410 is close to the radio frequency connector.

In the MIMO antenna provided in the present embodiment, the input terminal of each set of the power division circuits on the feeding network close to the radio frequency signal interface, which reduces a length of the circuit from the directional coupler to the output terminal, improves the space utilization rate of the circuit of the calibration network board and reduce the size of the calibration network board, thereby reducing the antenna cost.

In the antenna calibration network system, the antenna calibration network and the MIMO antenna described above, the plurality of directional coupler groups in the antenna calibration network is arranged along the horizontal direction, the first-stage combiner of the multi-stage combiner network is arranged at a side of the plurality of directional coupler groups, and the second-stage combiner of the multi-stage combiner network is arranged between each directional coupler group and arranged at the other side of the plurality of directional coupler group opposite to the first-stage combiner. In this way, space occupied by the directional coupler can be reduced and the free space among each directional coupler group can be fully utilized, which improves the space utilization rate of the circuit. Therefore, the antenna calibration network provided by the above embodiment can effectively reduce the antenna cost and improve product competitiveness.

It should be noted that, the above are merely embodiments of the present invention, those skilled in the art can make improvements without departing from the inventive concept of the present invention, however, these improvements shall belong to the protection scope of the present invention.

What is claimed is:

1. An antenna calibration network system for monitoring and comparing amplitudes and phases of a plurality of radio frequency signal ports, the antenna calibration network system comprising:
    a substrate;
    a plurality of directional coupler groups provided on the substrate and arranged in a horizontal direction; and
    a multi-stage combiner network provided at front ends of the plurality of directional coupler groups,
    wherein each of the plurality of directional coupler groups comprises two directional couplers arranged to be mirrored with respect to a vertical direction, wherein each of the two directional couplers comprises an input terminal connected to one of the plurality of radio frequency signal ports and a coupling terminal connected to the multi-stage combiner network and is a parallel coupled wire directional coupler, and a parallel coupled wire of each of the two directional couplers extends along the horizontal direction; and
    wherein the multi-stage combiner network comprises a plurality of first-stage combiners and a plurality of second-stage combiners,
    each of the plurality of first-stage combiners comprises two input terminals respectively connected to the coupling terminals of the two directional couplers of one of the plurality of directional coupler groups, and the plurality of first-stage combiners is arranged at one side of the plurality of directional coupler groups, and the plurality of second-stage combiners and the plurality of first-stage combiners are cascaded, and
    each of the plurality of second-stage combiners has two input terminals respectively connected to output terminals of two adjacent first-stage combiners of the plurality of first-stage combiners, and passes between two adjacent directional coupler groups of the plurality of directional coupler groups corresponding to the two adjacent first-stage combiners to the other side of the plurality of directional coupler groups.

2. The antenna calibration network system as described in claim 1, wherein the two adjacent first-stage combiners are symmetrically arranged at two sides of one of plurality of second-stage combiners connected thereto, respectively.

3. The antenna calibration network system as described in claim 1, wherein the multi-stage combiner network further comprises a plurality of second-above-stage combiners that is cascaded and arranged at a same side of the plurality of directional coupler groups as the plurality of second-stage combiners, and every adjacent combiners with a same stage of the multi-stage combiner network are symmetrically arranged at two sides of a combiner of the multi-stage combiner network having a higher stage than the stage of the adjacent combiners and connected to the adjacent combiners.

4. An antenna calibration network, comprising:
    at least two antenna calibration network systems comprising a first antenna calibration network system and a second antenna calibration network system, wherein each of the at least two antenna calibration network systems is the antenna calibration network system as described in claim 1, the multi-stage combiner network of the first antenna calibration network system is a first multi-stage combiner network, and the multi-stage combiner network of the second antenna calibration network system is a second multi-stage combiner network;
    a calibration port, wherein the first multi-stage combiner network and the second multi-stage combiner network are mirrored with respect to a horizontal line where the calibration port is located; and
    a final-stage combiner provided between the first multi-stage combiner network and the second multi-stage combiner network, wherein the final-stage combiner has two input terminals respectively connected to an output terminal of a highest-stage combiner of the first multi-stage combiner network and an output terminal of a highest-stage combiner of the second multi-stage combiner network, and an output terminal connected to the calibration port.

5. The antenna calibration network as described in claim 4, wherein the final-stage combiner comprises a first input terminal, a second input terminal and an output terminal, wherein a connecting wire between the first input terminal of the final-stage combiner and the output terminal of the highest-stage combiner of the first multi-stage combiner network extends along the vertical direction, a connecting line between the second input terminal of the final-stage combiner and the output terminal of the highest-stage combiner of the second multi-stage combiner network extends along the vertical direction, and a connecting line between the output terminal of the final-stage combiner and the calibration port extends along the horizontal direction.

6. A MIMO antenna, comprising a feeding network board, a reflective board, a dielectric board, a calibration network board, and a feeding core that are sequentially stacked;
   wherein the feeding network board comprises a feeding substrate and a plurality of sets of power division circuits provided on a surface of the feeding substrate facing away from the reflective board;
   the calibration network board comprises a calibration substrate and the antenna calibration network as described in claim 4, the antenna calibration network is provided on a surface of the calibration substrate facing the dielectric board, and the coupling terminal of each of the two directional couplers is connected to an input terminal of one set of the plurality of sets of power division circuits arranged on the feeding network board through the feeding core.

7. The MIMO antenna as described in claim 6, wherein the input terminal of each of the plurality of directional coupler groups arranged on the calibration network board is connected to a radio frequency connector.

8. The MIMO antenna as described in claim 7, wherein each of the two directional couplers of each of the plurality of directional coupler groups arranged on the calibration network board is close to the radio frequency connector, and the input terminal of each set of the plurality of sets of power division circuits arranged on the feeding network board is close to the radio frequency connector.

\* \* \* \* \*